UNITED STATES PATENT OFFICE

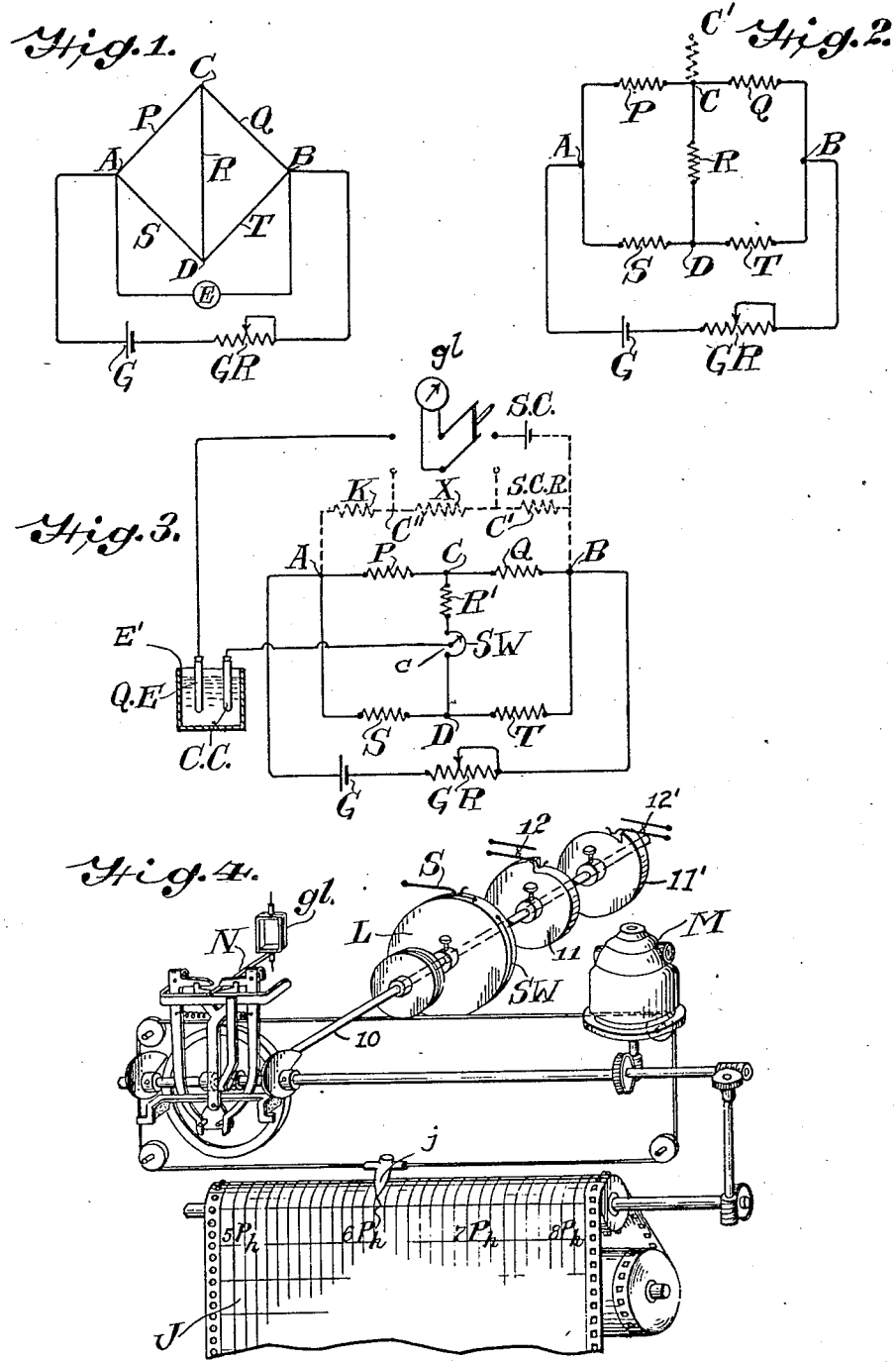

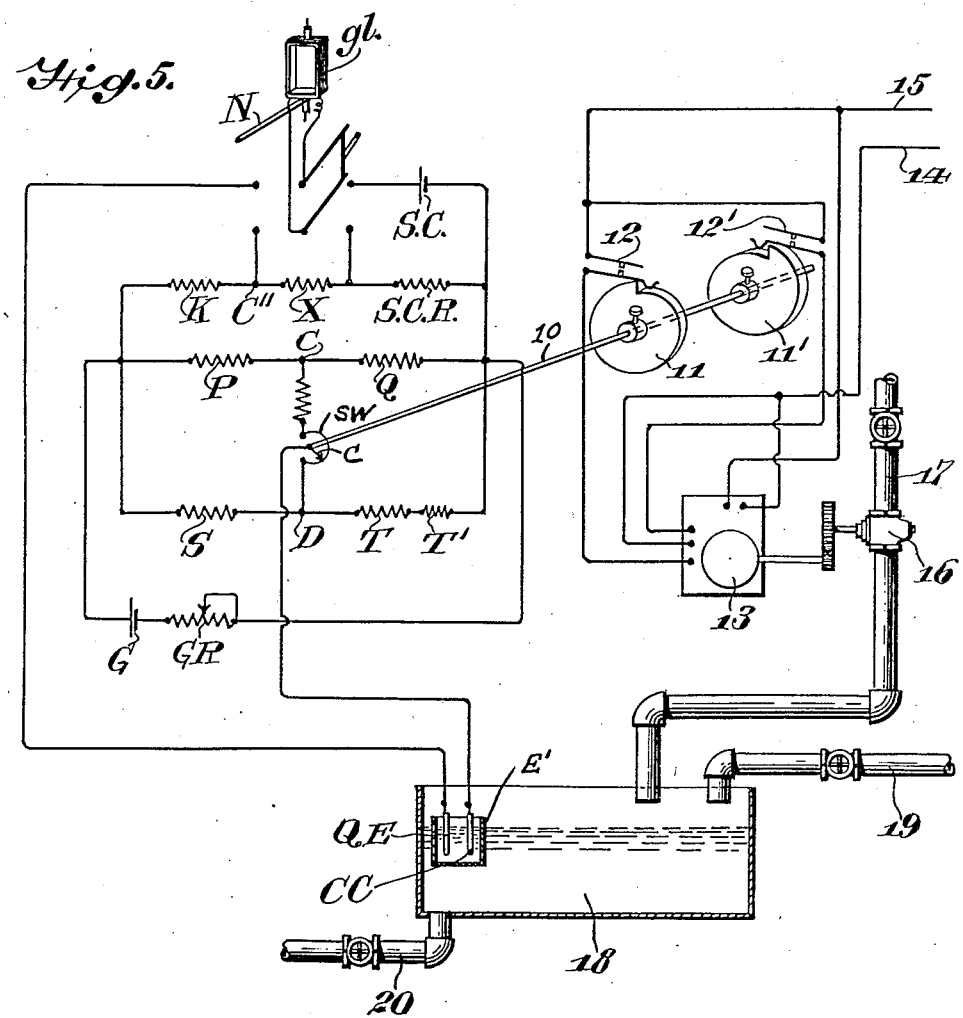

LEO BEHR, OF PHILADELPHIA, PENNSYLVANIA, ASSIGNOR TO LEEDS & NORTHRUP COMPANY, OF PHILADELPHIA, PENNSYLVANIA, A CORPORATION OF PENNSYLVANIA

METHOD OF AND APPARATUS FOR ELECTRICAL MEASUREMENT CONTROL

Application filed June 2, 1927. Serial No. 196,079.

My invention relates to a method of and apparatus for determining one of a plurality of variables upon the product of which depends an electromotive force or difference of potential.

In accordance with my invention, there is provided a network for balancing against the aforesaid electromotive force or difference of potential, or an electromotive force directly proportional thereto, another electromotive force or difference of potential which bears a predetermined or known relation to an electromotive force representative of the variables other than the variable to be determined.

My invention resides in a method of and apparatus for balancing a potential proportional to the product of two variable factors, more particularly to such a product increased or decreased by a fixed amount, against a second potential proportional to one of said factors to determine the ratio between said potentials, more particularly between the first potential decreased or increased by said fixed amount and said second potential, expressed in terms of the other of said factors.

My invention resides also in methods, apparatus and circuit arrangement hereinafter described and claimed.

For an understanding of my method and for illustration of some of the forms my apparatus and circuits may take, reference is to be had to the accompanying drawings in which:

Figs. 1 and 2 are explanatory diagrams.

Fig. 3 is a diagrammatic illustration of a network embodying my structure and suitable for carrying out my method.

Fig. 4 is in part a diagram and in part a perspective of automatic, indicating, recording or control apparatus utilizing my invention.

Fig. 5 is a diagram of circuit arrangements to produce an indication or measurement of ion concentration corrected or compensated for changes of a condition of the test cell electrodes, and to effect a control in response to said corrected measurement.

Without limitation of my invention thereto, and for a description of a system in which my invention is embodied, there is described that specific application of my invention utilizable for determining the ion concentration of electrolytes.

The relation between the concentration of a particular or selected ion and the potential difference between electrodes of predetermined nature in contact with the solution, containing the selected ion or ions, is known or determined. It has not been possible heretofore, however, to measure concentrations directly in terms of the potential difference as the latter is also affected by electrode changes, as per example, temperature changes.

For the purpose of explanation only, the description will be limited to a system which compensates for variations in cell temperature affecting the potential of a quinhydrone electrode used to measure the hydrogen ion concentration of potable water at temperatures from 5° to 25° C. While the circuit is adapted to compensate for other electrode changes, as described, it compensates for potential variation of any electrode, such as tungsten, hydrogen gas, oxygen, air, or metallic electrode, due to temperature changes whose electromotive force follows such a law as:

$$e = \pm a + k p_H \left(1 + \frac{t}{273}\right)$$

where,
$e$ = voltage
$a$ = constant plus or minus
$k$ = constant
$p_H$ = ion concentration $$\left(\text{more correctly log.} \frac{1}{\text{concentration}}\right)$$

$t$ = temperature of electrodes in °C.

or more generally $$e = \pm a + K T p_H$$

where
$T$ = absolute temperature.

The potential of the quinhydrone electrode, against a saturated calomel cell, is given by the expression:

$$e = -0.455 + 0.05404 p_H \left(1 + \frac{t}{273}\right)$$

a specific example of the formula above.

the variable portion of the expression for $e$, that is, $$0.054054 p_H \left(1 + \frac{t}{273}\right).$$

However, this point is never actually used. Instead, the point $C''$, between which and $C'$ there is a potential difference of 0.455 volts, is utilized so that the difference of potential between $C''$ and the movable contact C of the slide wire SW is, $$e = -0.455 + 0.054054 p_H \left(1 + \frac{t}{273}\right)$$

Assuming that it is desirable to have a current of 0.001 ampere in the upper branch, its total resistance will equal 2024.8 ohms and the position of point $C'$ is therefore determined, for the illustration given, by the relationships, $$\frac{BC'}{C'A} = \frac{89.64}{149.92}$$

$$BC' + C'A = 2024.8$$

As $C'$ is never actually used, as stated, to reach 0.455 volts above $C'$ to attain the point $C''$, it is necessary to move 455 ohms to the left, which makes $K = 812$ ohms. The purpose and values of resistances X and S C R are as follows:

The magnitude of resistance SCR is such that the product of this resistance and the current which is to be maintained constant therethrough is equal to the electromotive force of the standard cell SC, and in the present instance is 1,018 ohms. The value of X is such that the point $C''$ has the appropriate potential with respect to point $C'$, in the present instance being 194.8 ohms.

The point $C''$ is connected to a fixed contact of a double pole, double throw switch, and when the movable contact blades of the latter are thrown to the left, is placed in connection with the quinhydrone electrode (Q E) of a test cell E' through the galvanometer $gl$ whose terminals are connected, respectively, to the movable contact blades of the switch.

The effect of providing the point $C''$ is that of having in a network, an impedance between $C''$ and D only one of whose terminals D varies in potential with respect to any fixed reference point for different values of current passing through the impedance as distinguished from the impedance between points C, D, both of whose terminals simultaneously vary for a change of current therethrough.

The other electrode of the test cell E, which, as stated, may be a calomel half-cell C C is connected to the movable contact $c$ of the slide wire SW of the potentiometer. To determine the ion concentration of the solution in which the electrodes are placed, the contact $c$ is moved along the slide wire until the galvanometer $gl$ shows no deflection.

The slide wire SW may be calibrated directly in concentration units or potential units, so that by mere inspection it is possible to read the ion concentration of a solution or a quantity indicative of said concentration corrected for electrode changes. The double pole switch is thrown to the right to connect the standard cell S C to the network only when the potentiometer current is to be checked.

The network of Fig. 3 includes a circuit in the nature of a Wheatstone bridge, the latter comprising the impedance arms P, Q, S and T, in one of whose conjugate conductors is included a source of electromotive force or battery G and in the other or second conjugate conductor is included an impedance which in the example illustrated comprises the resistance R' and slide wire resistance SW. The galvanometer $gl$ is included in a conductor in series with the source of electromotive force E between the contact $c$, movable along the impedance in the second conjugate conductor of the bridge, and the point $C''$, in the network, external to the bridge. The potential of the point $C''$ is fixed, and is independent of the bridge. The current through the second conjugate conductor of the bridge, i. e., through R' and SW, varies with the magnitude of impedance, particularly T, in any bridge arm. The current through this second conjugate conductor is proportional to the difference of potential between the point $c$, fixed or variable, in the conjugate conductor CD, and an imaginary point in the network external to the bridge, such for example as $C'$, Figs. 2 and 3. The potential of and at the point $C''$ is at a fixed difference from the potential at the point $C'$.

A network of the character above described is generically of the character disclosed and claimed in my copending application Serial No. 92,158, filed March 4, 1926.

For automatic indication, measurement, recording or control of ion concentration of a solution, any suitable apparatus may be employed. As an example, there may be utilized apparatus of the character disclosed in prior Letters Patent to Leeds, No. 1,125,699, issued January 19, 1913.

In Fig. 4, apparatus of this general character is shown under control of the aforesaid galvanometer $gl$ of Fig. 3.

The movable coil or equivalent movable member of the galvanometer is shown in Fig. 4 at $gl$ for defecting the needle or pointer N whose sense and extent of deflection control the sense and extent of rotation of the shaft or movable structure 10. In other words, the deflecting system of the galvanometer controls a disengageable connection between the electric motor M and the movable structure or shaft 10, whose direction and extent of movement depend upon the extent and sense of deflection of the member N. The recording paper or sheet J is advanced at constant rate by the motor M past the marker or pen $j$ which is moved transversely of the record sheet by the movable structure 10. Upon the shaft 10 is secured the disk L upon which the slide wire SW of Fig. 3 is disposed.

Clockwise rotation of the slide wires in Fig. 4 corresponds with increase of H ion concentration and similarly traverse of the record paper J by the marker $j$ from left toward the right is in accord with increase of H ion concentration. For example, at the left margin of the paper may be a graduation corresponding to an H ion concentration of 5 in Sörenson's $p_H$ value, while to the right may be graduations corresponding with magnitudes up to 8 at the right margin; the curve or record drawn by the marker $j$ upon the sheet J will, therefore, be a continuous record of H ion concentration with respect to time.

As the movable structure is rotated in one direction or the other, the position of the contact $c$ upon the slide wire is varied in such sense as to tend to effect a balance of the character hereinbefore described, causing reduction in the deflection of the galvanometer $gl$, until eventually, when balance is obtained, the galvanometer needle N is in its midposition and the movable structure 10 is not rotated in either direction until there occurs a change in the ion concentration.

The apparatus may be utilized also for controlling or varying the magnitude of ion concentration, or for maintaining it constant. For this purpose, there may be secured upon the shaft 10 a cam disk 11 which, in rotation in one direction of shaft 10, closes the contacts 12, these contacts controlling, respectively, the direction of current through the armature of a reversible motor 13. A similar cam disk 11′ actuates contacts 12′ upon rotation of the shaft 10 in an opposite direction to reverse the flow of current through the armature of the motor 13. When the contacts 12 or 12′ are closed, current from supply conductors 14 15 is delivered to the motor causing its rotation in one direction or the other to operate through suitable gearing a valve 16 in the conduit 17 to control the rate of delivery or flow of any agent, which will vary the H ion concentration of the solution under control. For example, the conduit 17 may control the delivery of lime to a mixing chamber 18 receiving water for drinking purpose from an inflow pipe 19, which after treatment passes through the out-flow pipe 20 to a point of consumption. This rate of delivery will be varied in proper sense and to proper extent by the control mechanism of Fig. 4 under control of a circuit such as shown in Fig. 5.

It will be appreciated that in its broad aspect my invention is not limited to measurement of ionic concentration of a liquid, but may be utilized to determine any variable factor, the product of which and a second variable factor or such product and an additive term is proportional to an electric potential.

What I claim as my invention is:

1. The method of determining one of two variable factors whose product is proportional to a voltage derived from a source of current which consists of producing change in current from another current source proportional to variations of the other of said factors, amplifying the effect of said current change to modify a second voltage derived from said second current source proportional to said current change, and balancing said first voltage against said second voltage to determine their ratio in terms of said one of said factors.

2. The method of determining one of two variable factors whose product is proportional to a voltage derived from a source of current which consists of producing change in current from another current source proportional to variations of the other of said factors, producing a second current change proportional to, but of a different order of magnitude than said first current change, to modify proportionally a second voltage derived from said second current source, and balancing said first voltage against said second voltage to determine their ratio in terms of said one of said factors.

3. Means for determining one of two variable factors whose product is proportional to a potential difference derived from a source of current, consisting of a second source of current an impedance having a difference of potential between two points thereof proportional to the other of said factors and derived from said second current source, and connections to permit a balance between said potential differences to be effected.

4. A composite network for determining one of two variable factors whose product is proportional to a voltage derived from a source of current comprising a second source of current, component branches of said network traversed by current from said second source, one of said branches determining a point of fixed potential, and other of said branches determining a point whose potential differs from said fixed potential by an amount proportional to the other of said factors, and connections to permit the balancing of said potential difference derived from said second source of current against the voltage derived from said first source of current.

5. Means for determining one of two variable factors whose product is proportional to a voltage derived from a source of current, comprising a second source of current for producing a constant electro-motive force, a network having component branches in parallel with each other connected to said second source, one of said branches determining a point of fixed potential, and other of said branches determining a point whose potential differs from said fixed potential by an amount proportional to the other of said factors, and connections to permit the balancing of said potential difference against said voltage derived from said first source of current.

6. A network including a circuit in the nature of a Wheatstone bridge having a source of current in one of its conjugate conductors, of an impedance included in the second conjugate conductor of said bridge and traversed by the unbalance current thereof, a conductor including a galvanometer connected between a variable point in said second conjugate conductor and a point in said network of fixed potential, and a second source of current in series with said galvanometer between said points.

7. A network including a circuit in the nature of a Wheatstone bridge having a source of current in one of its conjugate conductors, of an impedance included in the second conjugate conductor of said bridge and traversed by the unbalance current thereof, a conductor including a galvanometer connected between a variable point in said second conjugate conductor of said bridge and a point in a branch of said network external to said bridge, and a second source of current in series with said galvanometer between said points.

8. A network including a circuit in the nature of a Wheatstone bridge having a source of current in one of its conjugate conductors, of an impedance included in the second conjugate conductor of said bridge, a conductor including a galvanometer connected between a contact movable along said impedance and another point in said network, and a second source of current in series with said galvanometer between said contact and said point.

9. A network including a circuit in the nature of a Wheatstone bridge having a source of current in one of its conjugate conductors, of an impedance included in the second conjugate conductor of said bridge, a conductor including a galvanometer connected between a contact movable along said impedance and a point in a branch of said network external to said bridge, and a second source of current in series with said galvanometer between said contact and said point.

10. A network including a circuit in the nature of a Wheatstone bridge having a source of current in one of its conjugate conductors, of an impedance included in the second conjugate conductor of said bridge, a conductor including a galvanometer connected between a contact movable along said impedance and a point in said network external to said bridge, and a second source of current in series with said galvanometer between said contact and said point.

11. A network including a circuit in the nature of a Wheatstone bridge having a source of electromotive force in one of its conjugate conductors, of an impedance included in the second conjugate conductor of said bridge traversed by the unbalance current thereof, a conductor including a galvanometer connected between a point in said second conjugate conductor and another point in said network, an ion-concentration cell whose terminal voltage is dependent upon the product of ion-concentration and temperature, in series in said conductor with said galvanometer, and an impedance in an arm of said bridge whose magnitude varies with temperature.

12. A network including a circuit in the nature of a Wheatstone bridge, of an impedance included in a conjugate conductor of said bridge, a conductor including a galvanometer connected between a contact variable along said impedance and another point in said network external of said bridge, an ion-concentration cell whose terminal voltage is dependent upon the product ion-concentration and temperature in series in said conductor with said galvanometer, an impedance in an arm of said bridge whose magnitude varies with temperature, and a scale associated with said movable contact having readings representative of ion concentration.

13. The method of determining the ion concentration of a solution, which comprises opposing a potential developed between electrodes immersed in a solution to a potential proportional to the temperature of said solution, and balancing said potentials to determine their ratio.

LEO BEHR.